United States Patent
Flammer, III

(10) Patent No.: US 9,727,760 B2
(45) Date of Patent: Aug. 8, 2017

(54) SYSTEM AND METHOD FOR COMMUNICATION BETWEEN RFID INTERROGATORS

(75) Inventor: George H. Flammer, III, Cupertino, CA (US)

(73) Assignee: SILVER SPRING NETWORKS, INC., San Jose, CA (US)

(*) Notice: Subject to any disclaimer, the term of this patent is extended or adjusted under 35 U.S.C. 154(b) by 486 days.

(21) Appl. No.: 13/335,722

(22) Filed: Dec. 22, 2011

(65) Prior Publication Data
US 2013/0162399 A1 Jun. 27, 2013

(51) Int. Cl.
G06K 7/10 (2006.01)

(52) U.S. Cl.
CPC ..... G06K 7/10039 (2013.01); G06K 7/10356 (2013.01)

(58) Field of Classification Search
CPC .... G01D 4/004; G01D 4/006; G06K 17/0022; G06K 7/0008; G06K 7/10356; G06K 7/10475; G08B 25/009; G08B 25/06; H04L 47/10; H04L 47/14; H04L 47/2433; H04L 47/2491; H04L 67/322; H04W 28/04
USPC ...................................................... 340/572.1
See application file for complete search history.

(56) References Cited

U.S. PATENT DOCUMENTS

| | | | |
|---|---|---|---|
| 2004/0069852 A1* | 4/2004 | Seppinen et al. | 235/451 |
| 2006/0240775 A1* | 10/2006 | Kuriki et al. | 455/41.1 |
| 2007/0139163 A1 | 6/2007 | Powell et al. | |
| 2007/0188306 A1* | 8/2007 | Tethrake et al. | 340/10.51 |
| 2008/0186145 A1 | 8/2008 | Manley et al. | |
| 2008/0238625 A1* | 10/2008 | Rofougaran et al. | 340/10.1 |
| 2008/0252459 A1* | 10/2008 | Butler | G06K 7/0008 340/572.1 |
| 2008/0297312 A1 | 12/2008 | Moshfeghi | |
| 2009/0184804 A1* | 7/2009 | Seppa | 340/10.1 |
| 2011/0310929 A1* | 12/2011 | Petite | H04W 72/082 375/130 |

FOREIGN PATENT DOCUMENTS

KR 10-2009-0045001 A 5/2009

OTHER PUBLICATIONS

International Search Report PCT/US12/071077 dated Apr. 24, 2013.

* cited by examiner

*Primary Examiner* — An T Nguyen
(74) *Attorney, Agent, or Firm* — Artegis Law Group, LLP

(57) ABSTRACT

One embodiment of the present invention sets forth a technique for efficiently interconnecting RFID interrogator elements. Each interrogator element is configured to function as both an RFID interrogator and an RFID tag. The RFID interrogator function enables one interrogator element to perform a read or write data operation to a second interrogator element functioning as an RFID tag. Two-way communications between interrogator elements is facilitated by read and write operations. A data backhaul network may be advantageously implemented as a wireless mesh network, comprising a plurality of interrogator elements, to transmit data from each interrogator element to a server for processing.

29 Claims, 5 Drawing Sheets

SYSTEM AND METHOD FOR COMMUNICATION BETWEEN RFID INTERROGATORS

BACKGROUND

Technical Field

Embodiments of the present invention relate generally to wireless digital communication systems and, more specifically, to a system and method for communication between radio frequency identifier (RFID) interrogators.

Description of the Related Art

A radio frequency identifier (RFID) network typically includes a plurality of RFID interrogators, each configured to read data from certain RFID tags that are positioned in sufficiently close proximity. This data is then conventionally transmitted upstream via a backhaul network to a server configured to process the data or log the data for later processing. Each RFID tag is configured to store certain data, which may comprise read-only, writeable, or measured data. For example, an RFID tag may store a product code or serial number for an associated article of manufacture. An RFID interrogator retrieves data stored within the RFID tag via a radio frequency (RF) communication transaction.

Certain RFID tags are referred to as "passive," and typically derive operating power by harvesting ambient RF energy. When the RFID interrogator attempts to read a passive RFID tag, sufficient ambient RF energy is provided to the passive RFID tag to power up and operate. To transmit stored data to the RFID interrogator, passive RFID tags typically employ backscatter techniques, which modulate reflected RF energy originating from the RFID interrogator. Certain other RFID tags are referred to as "active," and typically derive operating power from a battery or other robust power source. To transmit stored data to the RFID interrogator, active RFID tags typically generate a modulated RF signal. In both cases, the RFID interrogator conventionally transmits data to the RFID tag, and the RFID tag transmits stored data back to the RFID interrogator. In both cases, RFID interrogators are typically configured to avoid interference with each other, for example by remaining inactive while nearby RFID interrogators transmit RF energy to perform read transactions with associated RFID tags.

One challenge in deploying an RFID network is implementing the backhaul network, which must be connected to each RFID interrogator. One approach to implementing the backhaul network involves coupling a wired data network, such as a wired Ethernet network, to each RFID interrogator. Implementing a conventional wired backhaul network for the RFID interrogators is generally expensive and complex, with each different RFID interrogator requiring that a separate cable be routed and coupled to the RFID interrogator from a wired data switch. Alternatively, the backhaul network may be conventionally implemented using a standard wireless data networking technology, such as the industry standard "WiFi" or related technologies. Implementing a backhaul network using conventional wireless data networking technologies generally eliminates much of the cost and complexity associated with a wired data network, but introduces different problems, such as potential interference from other legitimate users of the wireless data networking technology.

As the foregoing illustrates, what is needed in the art is a more efficient technique for interconnecting RFID interrogators.

SUMMARY

One embodiment of the present invention sets forth a computer-implemented method for transmitting and receiving data via a radio signal, the method comprising: transmitting a first interrogation request to a first radio frequency identifier (RFID) device, receiving a first interrogation reply from the first RFID device, receiving a second interrogation request from a second RFID device, and transmitting a second interrogation reply to the second RFID device in response to the second interrogation request.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
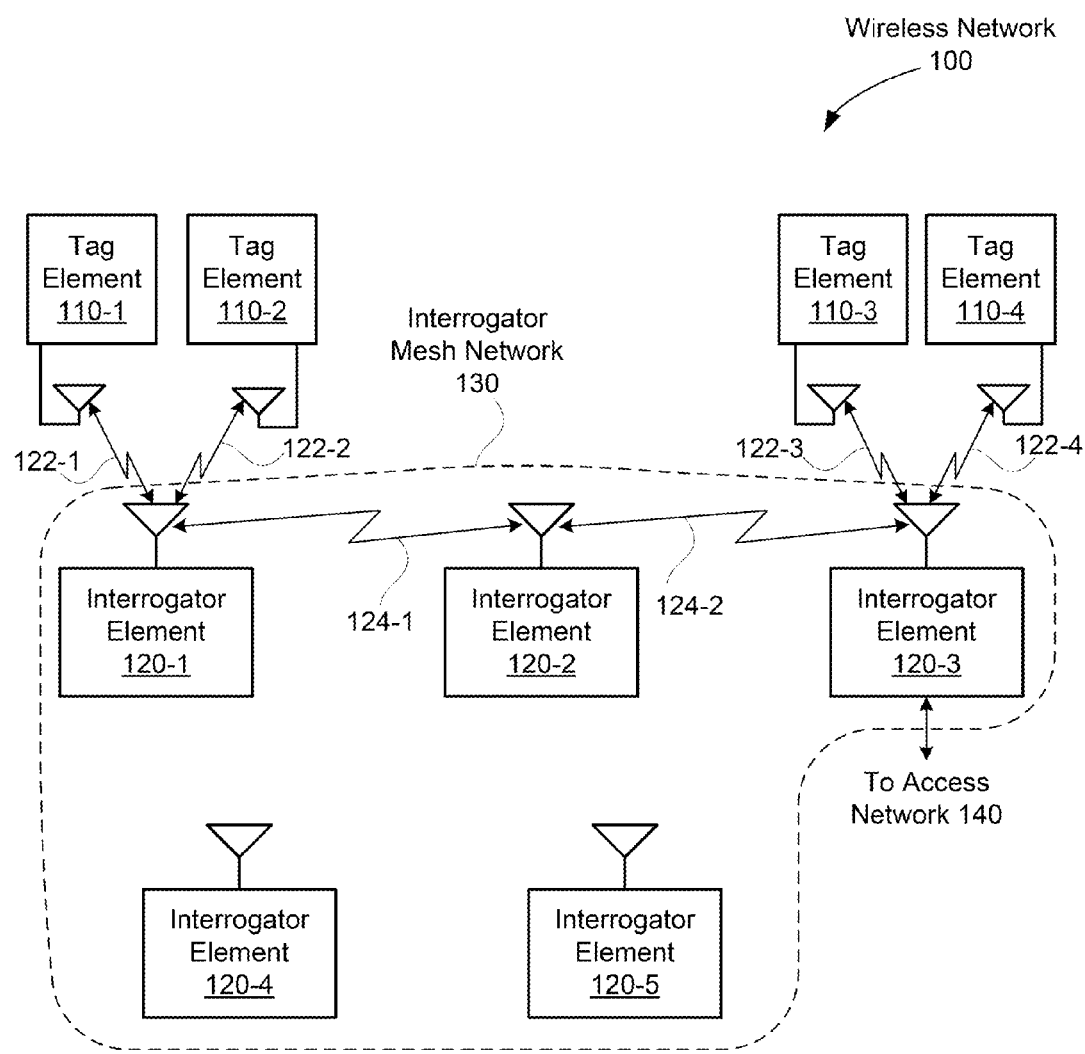
FIG. 1A illustrates a wireless network, configured to implement one or more aspects of the present invention.

FIG. 1A illustrates a wireless network 100, configured to implement one or more aspects of the present invention. The wireless network 100 includes interrogator elements 120 configured to both communicate with tag elements 110 and present as tags to other interrogator elements 120. For example interrogator element 120-1 may interrogate tag elements 110-1 and 110-2 via communications links 122-1 and 122-2, respectively. Each communications link 122 implements an RFID communications protocol employing a certain RF channel, or channels, and appropriate modulation techniques. The RFID communications protocol may also specify a specific range of frequencies organized as available RFID channels. Interrogator element 120-1 may also interrogate interrogator element 120-2, configured to temporarily operate as an RFID tag, via communications link 124-1. Similarly, interrogator element 120-2 may interrogate interrogator element 120-1, also configured to temporarily operate as an RFID tag. In one embodiment, communications links 124 operate within available RFID channels to implement a substantially identical RFID protocol as that implemented for communications links 122. In an alternative embodiment, communications links 124 implement a different protocol than the RFID protocol, for example to facilitate higher performance communications than enabled within the RFID protocol, but still utilizing an available RFID channel and adhering to regulatory requirements of the RFID channel.

Certain passive RFID tags utilize a backscatter modulation technique in which an interrogator element 120 transmits significantly more energy than an amount of backscatter energy received back from a tag element 110. The ratio of transmitted energy versus backscattered energy may be many orders of magnitude in some settings. Receiver sensitivity limitations and regulations defining maximum transmission power levels for RFID interrogators together limit a maximum distance from an interrogator element 120 to a tag element 110.

However, an interrogator element 120 configured to transmit data within maximum transmission power levels over an RFID channel may be located relatively far away from another interrogator element 120 configured to receive the data. Furthermore, two interrogator elements 120, each with an independent power source and each able to generate a unique RF signal for transmission, may be located relatively far apart compared to the maximum distance between an interrogator element 120 and a tag element 110 while achieving two-way communication and operating within the maximum transmission power level. Certain active RFID tags transmit a small amount of energy relative to a companion interrogator, creating a similar scenario, in which two interrogator elements 120 may be located relatively far apart while achieving two-way communication.

In one embodiment, pairs of interrogator elements 120 within an interrogator mesh network 130 are configured to perform two-way communications by taking turns alternately operating as either an RFID reader or an RFID tag. With two-way communication between interrogator elements 120, data may be routed between arbitrary source and destination interrogator elements 120 within interrogator mesh network 130. In an alternative embodiment, pairs of interrogator elements 120 achieve two-way communication within the interrogator mesh network 130 by transmitting data to each other via one or more RFID channels and within maximum transmission power levels, but without specific regard to RFID protocols.

One or more interrogator elements 120 may be coupled to an access network 140, providing access to interrogator elements 120. For example, interrogator element 120-3 may be coupled to an access network 130 via one or more suitable technologies, such as the technologies known in the art as wired Ethernet, WiFi, Bluetooth, or ZigBee.

Figure 1B:
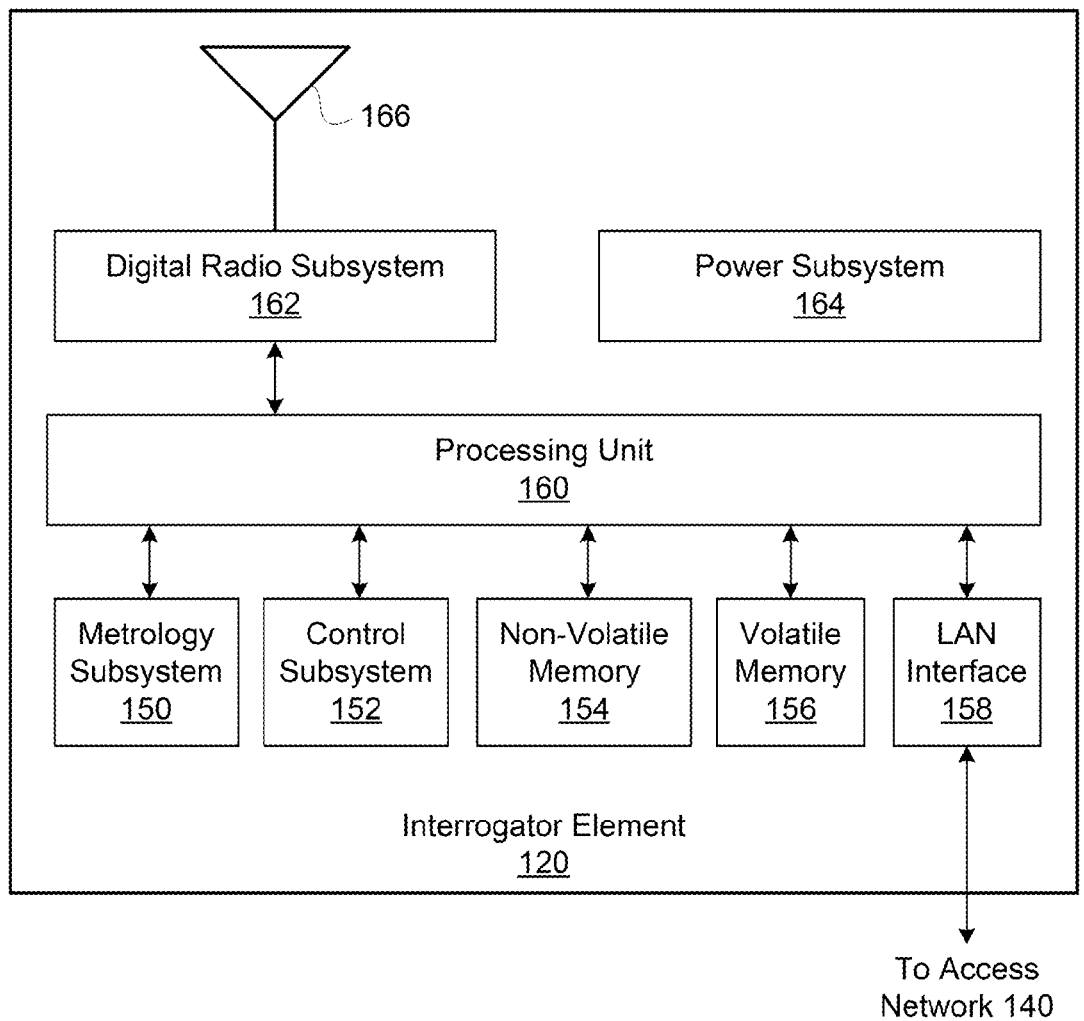
FIG. 1B illustrates an interrogator element configured to operate within the wireless network of FIG. 1A, according to one embodiment of the invention.

FIG. 1B illustrates an interrogator element 120 configured to operate within the wireless network 100 of FIG. 1A, according to one embodiment of the invention. The interrogator element 120 comprises a processing unit 160, a digital radio subsystem 162, a power subsystem 164, an antenna 166, a non-volatile memory 154, and volatile memory 156. Certain embodiments also comprise one or more additional elements, such as a metrology subsystem 150, a control subsystem 152, and a local area network (LAN) interface 158.

Processing unit 160 includes a processor core configured to retrieve and execute programming instructions from non-volatile memory 154. During the course of executing the programming instructions, the processor core may also store and retrieve data residing within the volatile memory 156. Digital radio subsystem 162 comprises a radio receiver circuit configured to demodulate and digitize incoming RF electrical signals. Digital radio subsystem 162 also comprises a radio transmitter circuit configured to modulate a digital signal to generate RF electrical signals for transmission. Antenna 166 converts incident electromagnetic energy into the incoming RF electrical signals and also converts the RF electrical signals for transmission into radiated electromagnetic energy. Power subsystem 164 comprises regulation and power conversion circuitry configured to provide electrical voltage sources to each circuit and subsystem within the interrogator element 120. Power subsystem 164 may also include an energy source such as a photovoltaic system, a battery or fuel cell. In one embodiment, LAN interface 158 includes circuitry to implement wired Ethernet, WiFi, Bluetooth, or ZigBee, or any combination thereof.

Metrology subsystem 150 comprises circuitry configured to perform one or more measurements, such as voltage, current, power, accumulated power, flow rate, accumulated flow, temperature, humidity, vibration, or any other quantifiable physical value or metric. Metrology subsystem 150 quantizes measured results into a digital value for processing and storage by processing unit 160. In one embodiment, metrology subsystem 150 comprises a power meter for measuring accumulated utilization of power. The control system 152 comprises one or more switches for controlling electrical signals. In one embodiment, control system 152 is a power switch for turning electrical power on or off.

Figure 2:
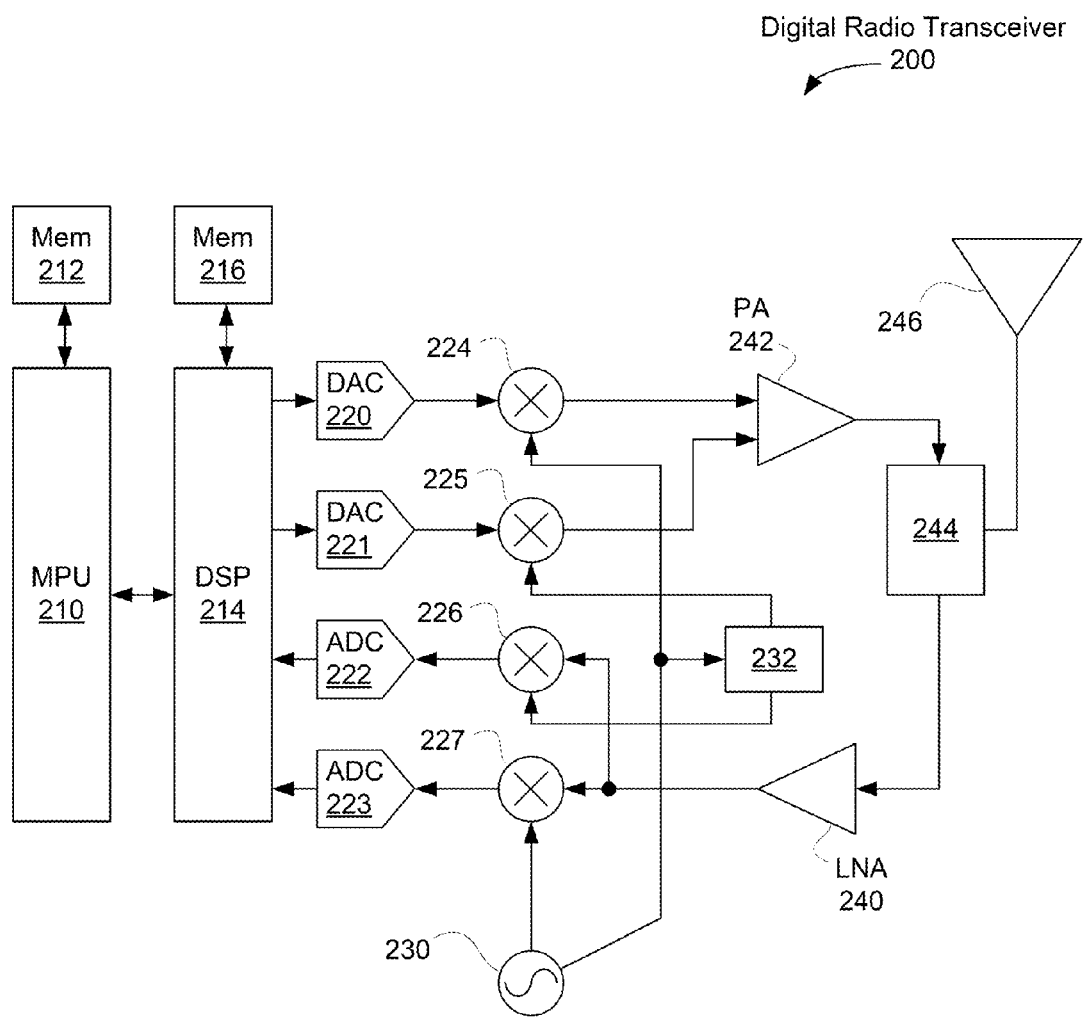
FIG. 2 illustrates a digital radio transceiver configured to implement one or more aspects of the present invention.

FIG. 2 illustrates a digital radio transceiver 200 configured to implement one or more aspects of the present invention. In one embodiment, digital radio transceiver 200 implements digital radio subsystem 162 of FIG. 1B. In another embodiment, digital radio transceiver 200 implements digital radio subsystem 162, MPU 210 implements processing unit 160, and memory 212 implements one or both of non-volatile memory 154 and volatile memory 156.

The digital radio transceiver 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage.

In one embodiment, the MPU 210 implements procedures for processing IP packets transmitted or received as payload data by the digital radio transceiver 200. The procedures for processing the IP packets may include, without limitation, wireless routing, encryption, authentication, protocol translation, and routing between and among different wireless and wired network ports.

The DSP 214 implements signal processing procedures for modulating a serialized representation of payload data comprising packets, such as IP packets or RFID protocol data, for wireless transmission, for example within the frequency range of available RFID channels. The serialized representation may encode one or more bits of payload data per modulation symbol or less than one bit per modulation symbol. A receiver may demodulate each modulation symbol to recover the one or more bits of payload data. In one embodiment the one or more bits of payload data are used to generate a corresponding IP packet. In another embodiment, the one or more bits of payload data are used to form an RFID interrogation message or an RFID interrogation response message.

The DSP 214 may also implement multi-channel modulation for simultaneous transmission of independent units of payload data via multiple, independent channels. Each independent channel occupies a different frequency range in a frequency domain representation of a transmitted radio signal. The DSP 214 also implements signal processing procedures for receiving payload data. The procedures may include, without limitation filtering, energy detection, signal characterization, and simultaneous demodulation of multiple, independent channels.

In one embodiment, the DSP 214 is configured to modulate data within a given channel using a particular modulation technique that is selected form a set of different modulation techniques, based on prevailing channel requirements. For a given packet of data, a particular transmission bit rate may be implemented using one of the different modulation techniques, based on channel conditions. For example, if a selected channel is subjected to a relatively large amount of noise, then a lower bit rate modulation technique that is more tolerant of noise may be selected. Alternatively, if a selected channel is subjected to relatively low noise and low loss, then a higher bit rate modulation technique may be selected despite a potentially reduced noise tolerance. Exemplary modulation techniques known in the art include, without limitation, frequency shift keying (FSK) and quadrature amplitude modulation (QAM). FSK may be implemented as a robust, but relatively low bit rate technique for representing one or more bits of data per modulation symbol as signal energy in at least one of two or more defined frequency bands. QAM may be implemented as a relatively high bit rate technique for representing a set of two or more bits per modulation symbol within an amplitude-phase space. Each possible value represented by the two or more bits is mapped to a unique region within the amplitude-phase space. A collection of regions within the amplitude-phase space is known as a constellation. During modulation, each set of two or more bits comprising a modulation symbol is encoded and mapped to an appropriate region within a corresponding constellation. Persons skilled in the art will understand that quadrature encoded signal pairs may be used to conveniently implement QAM modulation. Furthermore, any technically feasible modulation, demodulation, filtering, energy detection, and signal characterization techniques may be implemented by the DSP 214 without departing the scope and spirit of embodiments of the present invention.

The DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, the DSP 214 generates two modulated streams of outbound digital values, which are converted to corresponding analog quadrature signals by DACs 220, 221. The analog quadrature signals are separately mixed with a radio frequency (RF) carrier signal by analog mixers 224, 225 to generate corresponding quadrature RF signals, each having a frequency domain image centered about the frequency of the RF carrier signal. Oscillator 230 generates the RF carrier signal and phase shifter 232 generates a 90-degree shifted representation of the RF carrier signal for generating quadrature RF signals. The PA 242 combines the quadrature RF signals to generate a modulated RF signal, which is coupled through the antenna switch 244 to the antenna 246. The antenna 246 converts the modulated RF signal from an electrical representation to an electromagnetic representation for wireless transmission. The wireless transmission may be directed to a different instance of the digital radio transceiver 200, residing within a different node of the wireless mesh network 102.

When the digital radio transceiver 200 is receiving data, the antenna 246 converts an incoming electromagnetic RF signal to an electrical RF signal, which is coupled through the antenna switch 244 to the LNA 240. The LNA 240 amplifies the electrical RF signal and couples the amplified RF signal to analog mixers 226 and 227. The amplified RF signal is characterized as having a signal image centered about an RF carrier frequency. The analog mixer 227 shifts the signal image down in frequency to an in-phase baseband component of the signal image. The signal is in-phase with respect to the RF carrier signal generated by oscillator 230. The analog mixer 226 shifts the signal image down in frequency to a 90-degree shifted baseband component of the signal image. The in-phase and 90-degree shifted baseband signals comprise a quadrature representation of one or more channels within the electrical RF signal. A plurality of different frequency channels may be represented within the baseband signals. The DSP 214 is configured to map the stream of inbound digital values, comprising a time domain representation of the baseband signals, to a frequency domain representation of the baseband signals. Persons skilled in the art will recognize that the frequency domain representation may be used to efficiently isolate one data bearing signal within one channel from a signal within a different channel. Similarly, the frequency domain representation may be used to detect noise and interfering transmissions within a given channel.

In one embodiment, the oscillator 230 can be programmed to generate one selected frequency from a plurality of possible frequencies. Each of the plurality of frequencies corresponds to a different channel. The selected frequency determines a center channel for a range of channels that are concurrently available for processing by the DSP 214 to receive or transmit data. For example, if a frequency range of 4 MHz defines ten channels, then each channel is allocated a bandwidth of 400 kHz. In this example, a frequency range of 2,000 kHz representing five channels is processed by the DSP 214 for transmitting or receiving data on one or more of the five channels. If the oscillator 230 is programmed to generate a different selected frequency, then a different set of five concurrently available channels may be used for transmitting or receiving data. The center channel may be changed arbitrarily by programming the oscillator 230 independently of the DSP 214 operating on the concurrently available channels. The digital radio transceiver 200 may be configured with an arbitrary number of concurrently available channels, each having an arbitrary bandwidth without departing the scope and spirit of embodiments of the present invention.

Figure 3A:
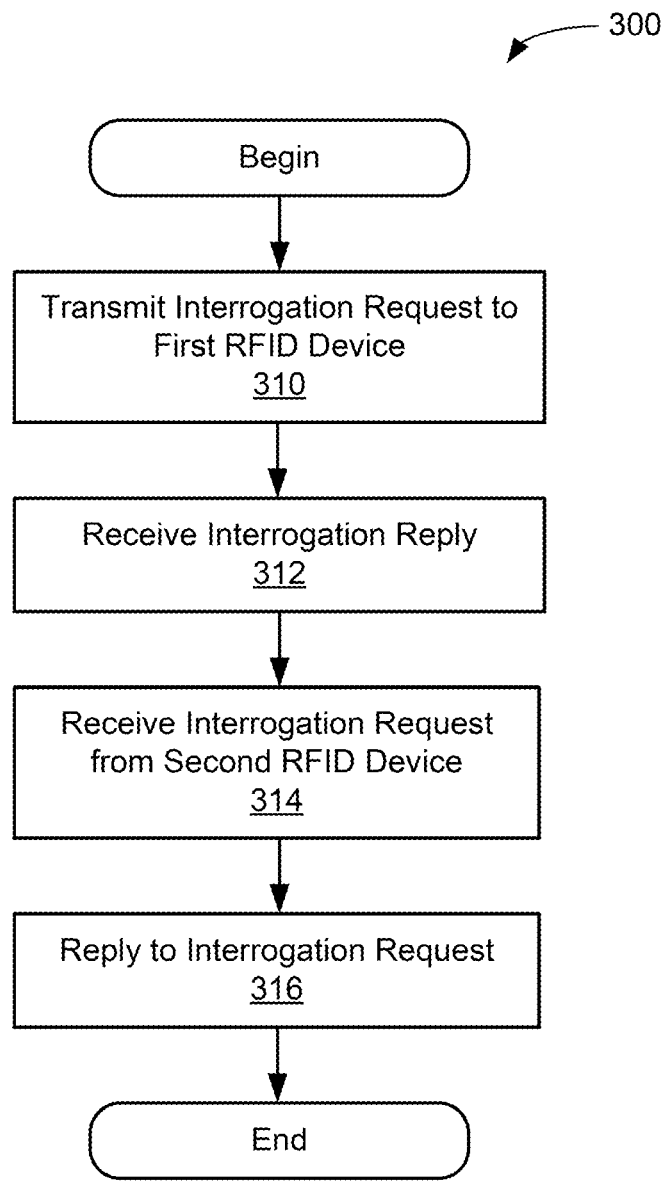
FIG. 3A is a flow diagram of a method for bidirectional communication performed by an interrogator element, according to one embodiment of the invention.

FIG. 3A is a flow diagram of a method 300 for bidirectional communication performed by an interrogator element, according to one embodiment of the invention. Although the method steps are described in conjunction with the systems of FIGS. 1A, 1B and 2, persons skilled in the art will understand that any system configured to perform the method steps, in any order, is within the scope of the present invention. This method 300 may be performed by the interrogator element 120 of FIG. 1A.

The method 300 begins in step 310, where the interrogator element 120 transmits an interrogation request to a first RFID device. In one embodiment, the interrogation request is structured according to any technically feasible RFID protocol, such as the well-known ISO 15693, or ISO 18000-7 protocols. In another embodiment, the interrogation request is structured according to a standard short-distance data protocol such as the well-known IEEE 802.11 (WiFi) standards or IEEE 802.15 (Bluetooth) standards. Prior to transmitting the interrogation request, the interrogator element 120 may configure the digital radio subsystem 162 of FIG. 1B to operate according to a particular protocol and on a selected frequency, for example within an available RFID channel. The interrogation request may comprise a read request to retrieve data from the first RFID device or a write request to transmit data to the RFID device. In step 312, the interrogator element 120 receives an interrogation reply from the first RFID device. The interrogation reply may include data from the interrogation element 120 or confirmation that a write operation was successful. In one embodiment, the interrogation reply conforms to the protocol of the interrogation request. After receiving the interrogation reply, the interrogator element 120 may configure the digital radio subsystem 162 to operate in a mode that is receptive to an incoming interrogation request.

In step 314, the interrogator element 120 receives an interrogation request from a second RFID device. In one embodiment, the interrogation request is structured according to an RFID protocol. The interrogation request may comprise a read request to retrieve data within the interrogator element 120 or a write request to transmit data to the interrogator element 120. In step 316, the interrogation element 120 replies to the interrogation request from the second RFID device in accordance with protocol requirements of the interrogation request. The reply may comprise data from the interrogator element 120 or confirmation that a write operation was successful within the interrogator element 120. The method 300 terminates in step 316.

In one embodiment, the first RFID device comprises an RFID tag, such as tag element 110, and the second RFID device comprises a different interrogator element 120. In this embodiment, interrogator element 120-1 may perform method steps 310 and 312 to read a first set of data from tag element 110-1, and method steps 314 and 316 to transmit a second set of data to interrogator element 120-2. The second set of data may include the first set of data or a derivative thereof.

In another embodiment, the first RFID device and the second RFID device both comprise interrogator elements 120. For example, interrogator element 120-2 may perform method steps 310 and 312 to read a first set of data from interrogator element 120-1 and method steps 314 and 316 to transmit a second set of data to interrogator element 120-3. The second set of data may include the first set of data or a derivative thereof. Alternatively, the interrogator element 120-2 may perform method steps 310 and 312 to write a first set of data to interrogator element 120-1 and method steps 314 and 316 to receive a second set of data from interrogator element 120-3. Persons skilled in the art will recognize that data may be pushed from one interrogator element 120 to another using a write mechanism or pulled from one interrogator element 120 to another using a read mechanism. Both read and write mechanisms of communication with RFID tags are known in the art and may be advantageously combined in certain embodiments of the present invention.

In yet another embodiment, the first RFID device and the second RFID device comprise the same type of device, such as interrogator device 120, configured to operate as both an RFID interrogator and an RFID tag. The method steps 310 through 316 may be performed for two-way communication between the two interrogator devices 120.

Figure 3B:
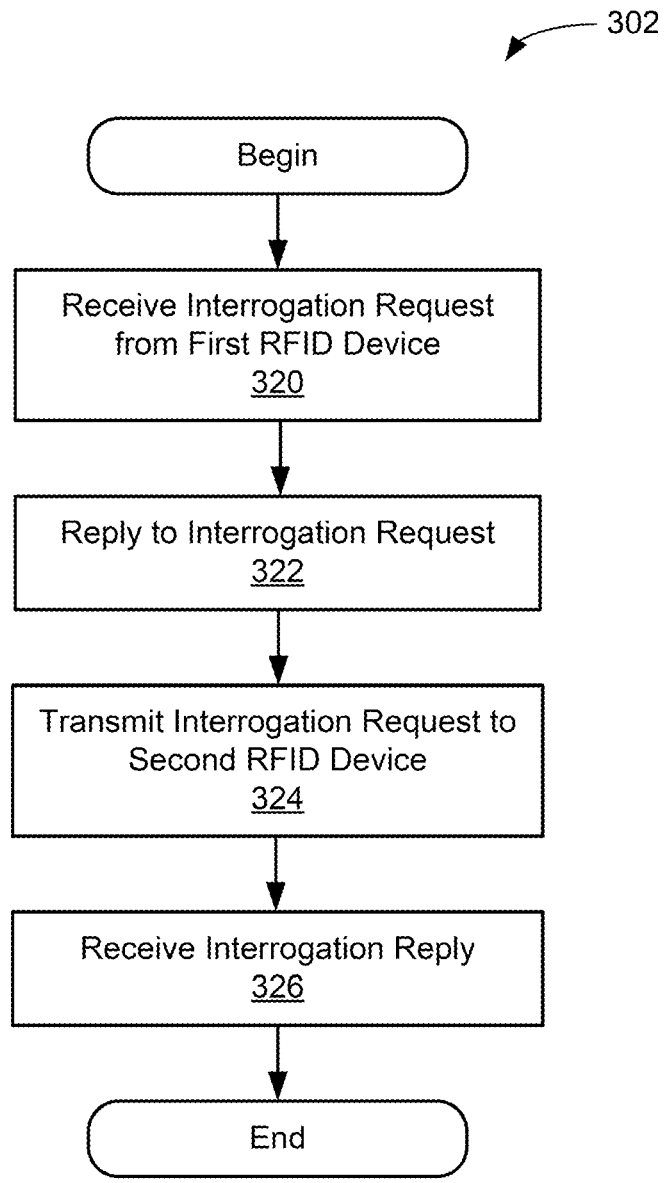
FIG. 3B is a flow diagram of a method for bidirectional communication performed by an interrogator element, according to one embodiment of the invention.

FIG. 3B is a flow diagram of a method 302 for bidirectional communication performed by an interrogator element, according to one embodiment of the invention. Although the method steps are described in conjunction with the systems of FIGS. 1A, 1B and 2, persons skilled in the art will understand that any system configured to perform the method steps, in any order, is within the scope of the present invention. This method 302 may be performed by the interrogator element 120 of FIG. 1A.

The method 302 begins in step 320, where the interrogator element 120 receives an interrogation request from a first RFID device. In one embodiment, the interrogation request is structured according to any technically feasible RFID protocol, such as the well-known ISO 15693, or ISO 18000-7 protocols. In another embodiment, the interrogation request is structured according to a standard short-distance data protocol such as the well-known IEEE 802.11 (WiFi) standards or IEEE 802.15 (Bluetooth) standards. Prior to receiving the interrogation request, the interrogator element 120 may configure the digital radio subsystem 162 of FIG. 1B to operate according to a particular protocol and on a selected frequency, for example within an available RFID channel. The interrogation request may comprise a read request to retrieve data from the interrogator element 120 or a write request to transmit data to the interrogator element 120.

In step 322, the interrogator element 120 replies to the interrogation request by transmitting an interrogation reply from the first RFID device. In one embodiment, the interrogation reply conforms to the protocol of the interrogation request. The interrogation reply may include data from the interrogation element 120 or confirmation that a write operation was successful within the interrogation element 120. The interrogator element 120 may configure the digital radio subsystem 162 to confirm to a particular protocol, such as an RFID protocol, prior to transmitting the interrogation reply. After transmitting the interrogation reply, the interrogator element 120 may configure the digital radio subsystem 162 to operate in a mode that is receptive to another incoming interrogation request.

In step 324, the interrogator element 120 transmits an interrogation request to a second RFID device. In one embodiment, the interrogation request is structured according to an RFID protocol. The interrogation request may comprise a read request to retrieve data within the second RFID device or a write request to transmit data to the second RFID device. In step 326, the interrogation element 120 replies to the interrogation request from the second RFID device in accordance with protocol requirements of the interrogation request. The reply may comprise data from the second RFID device or confirmation that a write operation was successful within the second RFID device. The method 302 terminates in step 326.

In one embodiment, the first RFID device and the second RFID device both comprise interrogator elements 120. For example, interrogator element 120-2 may perform method steps 320 and 322 to receive a first set of data from interrogator element 120-1 and method steps 314 and 316 to transmit a second set of data to interrogator element 120-3. The second set of data may include the first set of data or a derivative thereof. Alternatively, the interrogator element 120-2 may perform method steps 310 and 312 to transmit a first set of data to interrogator element 120-1 and method steps 314 and 316 to receive a second set of data from interrogator element 120-3. Persons skilled in the art will recognize that data may be pushed from one interrogator element 120 to another using a write mechanism or pulled from one interrogator element 120 to another using a read mechanism. Both read and write mechanisms of communication with RFID tags are known in the art and may be advantageously combined in certain embodiments of the present invention.

In another embodiment, the first RFID device comprises interrogator element 120-2, and the second RFID device comprises tag element 110-1. In this embodiment, interrogator element 120-1 may perform method steps 320 and 322 to receive a first set of data from interrogator element 120-2, and method steps 324 and 326 to read a second set of data from tag element 110-1.

In yet another embodiment, the first RFID device and the second RFID device comprise the same device, such as another interrogator device 120. The method steps 320 through 326 may be performed for two-way communication between the two interrogator devices 120.

In certain embodiments, the interrogator element 120 implements a power meter configured to measure accumulated power consumption and report the accumulated power consumption via the interrogator mesh network 130 of FIG. 1A to a server coupled to the access network 140. In such embodiments, each interrogator element 120 may operate independently to measure a corresponding sample of accumulated power consumption and report the sample of accumulated power consumption via a push regime or a pull regime, or a combination thereof through the interrogator mesh network 130. In this way, accumulated power consumption samples for all interrogator elements 120 may be gathered by the server.

In sum, a technique for implementing two-way communication between interrogator elements in a wireless network is disclosed. An interrogator element is configured to operate as both an RFID reader and an RFID tag to achieve two-way communication with a different interrogator element. Each interrogator element may participate in an interrogator mesh network configured to route data between the participating interrogator elements. Each interrogator element may also act as a conventional RFID interrogator that communicates with RFID tag devices.

One advantage of the disclosed systems and methods is that a backhaul network that interconnects RFID interrogators may be efficiently implemented by combining interrogator and tag behavior within a single interrogator element device.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A computer-implemented method for transmitting and receiving data via a radio signal, the method comprising:
    transmitting, via a first channel included in a plurality of available channels that are generated concurrently by a digital radio transceiver, a first interrogation request to a first radio frequency identifier (RFID) tag device according to an RFID communication protocol that specifies a range of frequencies organized as available RFID channels;
    receiving, via a second channel included in the plurality of available channels, a first interrogation reply transmitted from the first RFID tag device according to the RFID communication protocol; and
    with respect to each RFID interrogator device included in a plurality of RFID interrogator devices in an interrogator network, transmitting, via any currently available channel included in the plurality of available channels, data to the RFID interrogator device according to a second communication protocol, wherein the second communication protocol is different than the RFID communication protocol and adheres to a plurality of regulatory requirements associated with an available RFID channel.

2. The method of claim 1, wherein the first interrogation request comprises a read request for a first set of data residing within the first RFID tag device, and the first interrogation reply comprises a first message that includes the first set of data.

3. The method of claim 1, wherein the first interrogation request comprises a write request for a second set of data to be written to the first RFID tag device, and the first interrogation reply comprises a second message that confirms a successful write operation for the second set of data within the first RFID tag device.

4. The method of claim 1, wherein the data is transmitted in response to a read request.

5. The method of claim 1, wherein the data is transmitted in response to a write request and confirms a successful write operation.

6. The method of claim 1, further comprising:
    receiving a second interrogation request from a third RFID device; and transmitting a second interrogation reply to the third RFID device in response to the third interrogation request.

7. The method of claim 1, wherein the data comprises at least a portion of the first interrogation reply.

8. The method of claim 2, wherein the first set of data comprises metrology data measured by the first RFID tag device.

9. The method of claim 8, wherein the metrology data comprises accumulated power consumption data.

10. The method of claim 1, wherein the first RFID tag device comprises an interrogator element.

11. A non-transitory computer-readable storage medium including instructions that, when executed by a processing unit, cause the processing unit to transmit one or more data packets via a radio signal by performing the steps:

transmitting, via a first channel included in a plurality of available channels that are generated concurrently by a digital radio transceiver, a first interrogation request to a first radio frequency identifier (RFID) tag device according to an RFID communication protocol that specifies a range of frequencies organized as available RFID channels;

receiving, via a second channel included in the plurality of available channels, a first interrogation reply transmitted from the first RFID tag device according to the RFID communication protocol; and with respect to each RFID interrogator device included in a plurality of RFID interrogator devices in an interrogator network, transmitting, via any currently available channel included in the plurality of available channels, data to the RFID interrogator device according to a second communication protocol, wherein the second communication protocol is different than the RFID communication protocol and adheres to a plurality of regulatory requirements associated with an available RFID channel.

12. The non-transitory computer-readable storage medium of claim 11, wherein the first interrogation request comprises a read request for a first set of data residing within the first RFID tag device, and the first interrogation reply comprises a first message that includes the first set of data.

13. The non-transitory computer-readable storage medium of claim 11, wherein the first interrogation request comprises a write request for a second set of data to be written to the first RFID tag device, and the first interrogation reply comprises a second message that confirms a successful write operation within the first RFID tag device.

14. The non-transitory computer-readable storage medium of claim 11, wherein the data is transmitted in response to a read request.

15. The non-transitory computer-readable storage medium of claim 11, wherein the data is transmitted in response to a write request and confirms a successful write operation.

16. The non-transitory computer-readable storage medium of claim 11, further comprising:

receiving a second interrogation request from a third RFID device; and transmitting a second interrogation reply to the third RFID device in response to the second interrogation request.

17. The non-transitory computer-readable storage medium of claim 11, wherein the data comprises at least a portion of the first interrogation reply.

18. The non-transitory computer-readable storage medium of claim 12, wherein the first set of data comprises accumulated power consumption data measured by the first RFID tag device.

19. The non-transitory computer-readable storage medium of claim 11, wherein the first RFID tag device comprises an interrogator element.

20. A wireless network device, comprising:

a radio transceiver circuit configured to generate a radio signal for data transmission and to receive a signal for data reception; and a processing unit that is coupled to the radio transceiver circuit and configured to:

transmit, via a first channel included in a plurality of available channels that are generated concurrently by a digital radio transceiver, a first interrogation request to a first radio frequency identifier (RFID) tag device according to an RFID communication protocol that specifies a range of frequencies organized as available RFID channels;

receive, via a second channel included in the plurality of available channels, a first interrogation reply transmitted from the first RFID tag device according to the RFID communication protocol; and with respect to each RFID interrogator device included in a plurality of RFID interrogator devices in an interrogator network, transmit, via any currently available channel included in the plurality of available channels, data to the RFID interrogator device according to a second communication protocol, wherein the second communication protocol is different than the RFID communication protocol and adheres to a plurality of regulatory requirements associated with an available RFID channel.

21. The wireless network device of claim 20, wherein the data comprises accumulated power consumption data measured by the first RFID tag device.

22. The computer-implemented method of claim 1, wherein the second communication protocol affords higher performance communication than the RFID communication protocol.

23. The non-transitory computer-readable medium of claim 11, wherein the second communication protocol affords higher performance communication than the RFID communication protocol.

24. The wireless network device of claim 20, wherein the second communication protocol affords higher performance communication than the RFID communication protocol.

25. The computer-implemented method of claim 1, wherein the data is transmitted to the RFID interrogator device via the second channel included in the plurality of available channels.

26. The computer-implemented method of claim 1, wherein the data is received within the first interrogation reply according to the RFID protocol and on the first channel and then transmitted to the RFID interrogator device according to the second communication protocol and on the second channel.

27. The computer-implemented method of claim 1, further comprising changing the plurality of available channels by adjusting an oscillator, wherein the oscillator is adjusted independently of a digital signal processor that operates on the plurality of available channels.

28. The computer-implemented method of claim 1, wherein the currently available channel comprises the first channel.

29. The computer-implemented method of claim 1, wherein the currently available channel comprises the second channel.

* * * * *